(12) United States Patent
D'Halluin et al.

(10) Patent No.: US 10,824,612 B2
(45) Date of Patent: Nov. 3, 2020

(54) KEY TICKETING SYSTEM WITH LOCK-FREE CONCURRENCY AND VERSIONING

(71) Applicant: Western Digital Technologies, Inc., San Jose, CA (US)

(72) Inventors: Carl Rene D'Halluin, Zwijnaarde (BE); Bastiaan Stougie, Havant (BE); Koen De Keyser, Sint-Denijs (BE); Thomas Demoor, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 225 days.

(21) Appl. No.: 15/986,789

(22) Filed: May 22, 2018

(65) Prior Publication Data

US 2019/0057124 A1 Feb. 21, 2019

Related U.S. Application Data

(60) Provisional application No. 62/548,375, filed on Aug. 21, 2017.

(51) Int. Cl.
| | |
|---|---|
| *G06F 16/00* | (2019.01) |
| *G06F 16/23* | (2019.01) |
| *G06F 16/22* | (2019.01) |
| *G06F 16/21* | (2019.01) |

(52) U.S. Cl.
CPC ........ *G06F 16/2322* (2019.01); *G06F 16/219* (2019.01); *G06F 16/2272* (2019.01); *G06F 16/2315* (2019.01); *G06F 16/2365* (2019.01)

(58) Field of Classification Search
CPC ............. G06F 16/2322; G06F 16/2315; G06F 16/219; G06F 16/2365; G06F 16/2272
See application file for complete search history.

(56) References Cited

U.S. PATENT DOCUMENTS

| | | |
|---|---|---|
| 5,280,612 A | 1/1994 | Lorie et al. |
| 5,682,537 A | 10/1997 | Davies et al. |

(Continued)

FOREIGN PATENT DOCUMENTS

| | | |
|---|---|---|
| CN | 105740447 A | 7/2016 |
| IN | 2015KO00101 A | 12/2015 |

(Continued)

OTHER PUBLICATIONS

International Search Report and Written Opinion, PCT/US2018/035921, dated Aug. 27, 2018, p. 1-14.

(Continued)

*Primary Examiner* — Leslie Wong
(74) *Attorney, Agent, or Firm* — Patent Law Works LLP

(57) ABSTRACT

Novel key ticketing technology includes an example method in which a first request associated with a first object storage operation is received. The first request includes a first timestamp associated with the first object storage operation and a first object identifier identifying a first object associated with the first object storage operation. The method calculates a first inverse timestamp based on the first timestamp, and generates a first object key corresponding to the first object storage operation. The first object key includes at least the first object identifier and the first inverse timestamp. The method further inserts a first entry including the first object key into a key data store at a position relative to other object key entries based on the first object identifier and the first inverse timestamp included in the first object key.

20 Claims, 8 Drawing Sheets

(56) References Cited

U.S. PATENT DOCUMENTS

| | | | |
|---|---|---|---|
| 5,806,074 | A | 9/1998 | Souder et al. |
| 5,937,414 | A | 8/1999 | Souder et al. |
| 6,434,575 | B1 | 8/2002 | Berry et al. |
| 6,606,626 | B1 | 8/2003 | Ponnekanti |
| 7,962,458 | B2 | 6/2011 | Holenstein et al. |
| 9,171,044 | B2 | 10/2015 | Schleimer et al. |
| 9,223,877 | B1 | 12/2015 | Cao et al. |
| 9,317,576 | B2 | 4/2016 | Merriman et al. |
| 9,396,202 | B1 | 7/2016 | Drobychev et al. |
| 9,400,828 | B2 | 7/2016 | Kesselman et al. |
| 2009/0228443 | A1 | 9/2009 | Lapin et al. |
| 2011/0302143 | A1* | 12/2011 | Lomet ............... G06F 16/2322 707/704 |
| 2012/0254175 | A1 | 10/2012 | Horowitz et al. |
| 2013/0006993 | A1 | 1/2013 | Kobayashi |
| 2013/0117654 | A1 | 5/2013 | Rosner |
| 2013/0297697 | A1 | 11/2013 | Haimovitch et al. |
| 2013/0311422 | A1 | 11/2013 | Walker et al. |
| 2014/0006458 | A1 | 1/2014 | Hsieh et al. |
| 2014/0149353 | A1 | 5/2014 | Lee et al. |
| 2015/0067088 | A1 | 3/2015 | Guerin et al. |
| 2015/0081810 | A1 | 3/2015 | Christianto et al. |
| 2015/0172412 | A1 | 6/2015 | Escriva et al. |
| 2015/0213109 | A1 | 7/2015 | Kassko et al. |
| 2015/0317349 | A1* | 11/2015 | Chao ............... G06F 16/278 707/615 |
| 2016/0110109 | A1 | 4/2016 | Cowling et al. |
| 2016/0147811 | A1 | 5/2016 | Eluri et al. |
| 2016/0179850 | A1* | 6/2016 | Martin ............... G06F 16/214 707/634 |
| 2016/0210228 | A1 | 7/2016 | Tandel |
| 2017/0185625 | A1 | 6/2017 | Cheru et al. |
| 2017/0193031 | A1 | 7/2017 | Papapanagiotou et al. |
| 2018/0225051 | A1 | 8/2018 | Vansa |

FOREIGN PATENT DOCUMENTS

| | | |
|---|---|---|
| WO | 2013019888 A1 | 2/2013 |
| WO | 2014008495 A2 | 1/2014 |

OTHER PUBLICATIONS

Dragojevic, A., et al., FaRM: Fast Remote Memory, Paper of the Proceedings of the 11th USENIX Symposium on Networked Systems Design and Implementation, Apr. 2-4, 2014, p. 400-414, Seattle, WA, https://www.usenix.org/conference/nsdi14/ technical-sessions/dragojevic.

Gao, et al., Application Specific Data Replication for Edge Services, Paper, May 20-24, 2003, p. 1-16, Budapest, Hungaryb http://www2003.org/cdrom/papers/refereed/p669/www03_xhtml/lead.html.

Goel, S. et al., Data Replication Strategies in Wide Area Distributed Systems, Paper, 2006, p. 1-27, the University of Melbourne, Australia, http://www.cloudbus.org/papers/DataReplicationInDSChapter2006.pdf.

Haapasalo, T., et al., Concurrent Updating Transactions on Versioned Data, Paper, Sep. 16-18, 2009, p. 77-87, Finland.

Ho, Ricky, "Everything You Need to Know About Couchbase Architecture," Database Zone, Jul. 12, 2012, 23 pages.

Hoffer, Jeffrey A. et al., Modern Database Management, Advanced Database Topics, Part V, Chapter 12, "Distributed Databases," 2013, 28 pages <http://wps.pearsoned.co.uk/wps/media/objects/10977/11240737/Web%20chapters/Chapter%2012_WEB.pdf>.

Katsov, I., Distributed Algorithms in NoSQL Databases, Highly Scalable Blog, Date Accessed Oct. 12, 2016, p. 1-18, https://highlyscalable.wordpress.com/2012/09/18/distributed-algorithms-in-nosql-databases/.

Krzyzanowski, Paul et al., "Distributed Systems 20. Spanner," Nov. 21, 2016, 14 pages <https://www.cs.rutgers.edu/~pxk/417/notes/content/20-spanner-slides.pdf>.

Murat, Spanner: Google's Globally-Distributed Database, Jul. 4, 2013, 5 pages <http://muratbuffalo.blogspot.in/2013/07/spanner-googles-globally-distributed_4.html>.

Rystsov, Denis, Visualization of serializable cross shard client-side transactions, Mar. 2, 2016, 5 pages <http://rystsov.info/2016/03/02/cross-shard-txs.html>.

Taherimonfared, A., et al., Real-Time Handling of Network monitoring Data Using a Data-Intensive Framework, Paper, 2013, p. 258-265, IEEE International Conference on Cloud Computing Technology and Science.

Wei, X., et al., Fast In-Memory Transaction Processing Using RDMA and HTM, Shanghai Jiao Tong University Paper, Oct. 4-7, 2015, p. Monterey, CA.

Amazon Simple Storage Service Developer Guide, API Version, Mar. 1, 2006, p. 1-6, http://docs.aws.amazon.com/AmazonS3/latest/dev/mpuoverview.html.

Kaur et al., "Concurrency Control in Distributed Database System," International Journal of Advanced Research in Computer Science and Software Engineering, vol. 3, Issue 7, Jul. 2013 (5 pages).

Tracy, "Serializable, Lockless, Distributed: Isolation in CockroachDB," May 4, 2016 (10 pages).

International Preliminary Report on Patentability, PCT/US2018/035921, dated Mar. 5, 2020 (8 pages).

* cited by examiner

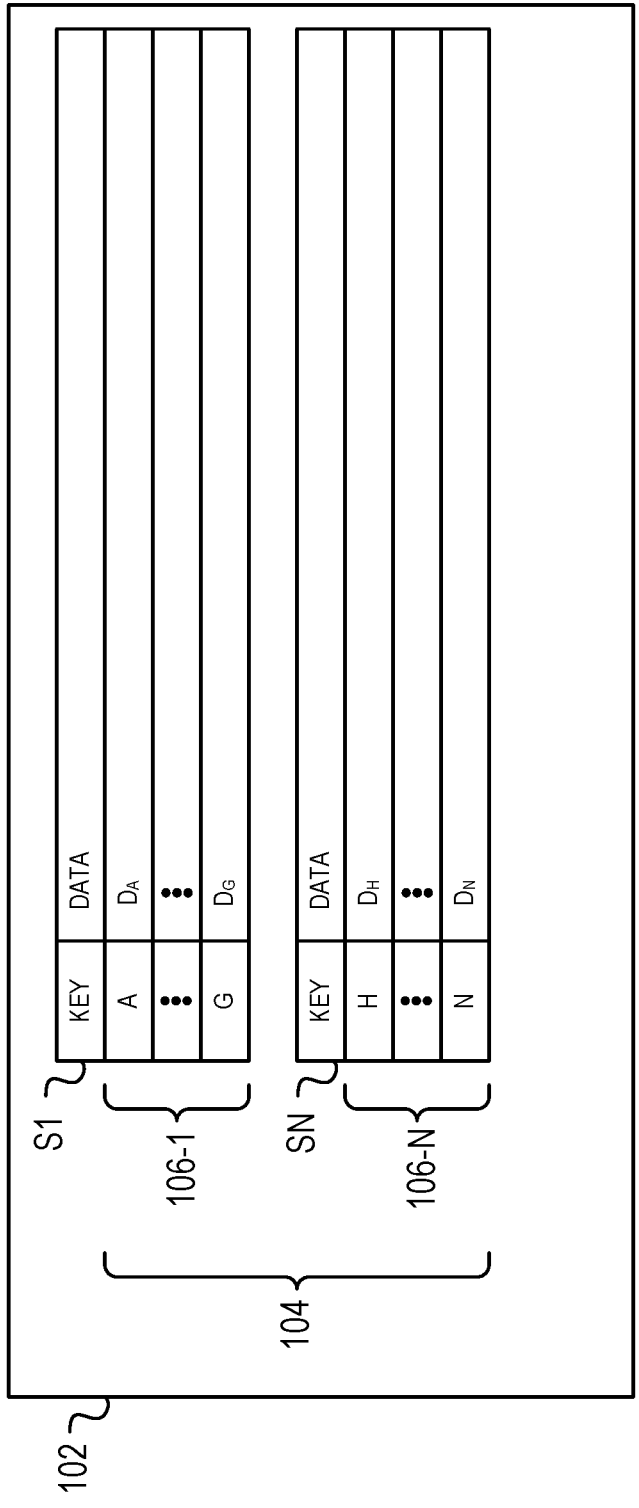
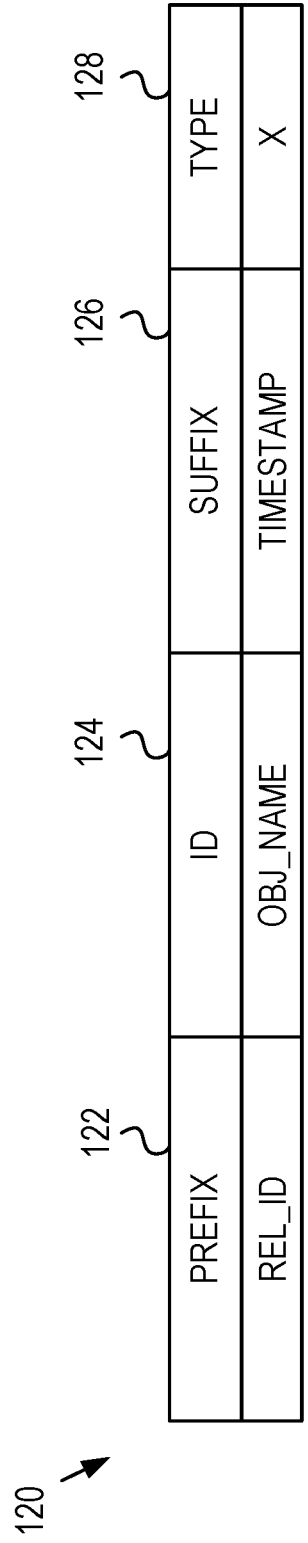
FIG. 1A
FIG. 1B

No entry in KDS 230 for OBJECT_X
    a. Get ticket (20) => 80
702 → b. Get first entry ticket (OBJECT_X) => no entry in KDS 230
    c. Insert key (OBJECT_X.80.W) in KDS 230

First entry in KDS 230 for OBJECT_X with ticket = 90
    a. Get ticket (20) => 80
704 → b. Get first entry ticket (OBJECT_X) => 90
    c. Ticket_a < ticket_b => Yes
    d. Insert key OBJECT_X.80.W in KDS 230

First entry in KDS 230 for OBJECT_X with ticket = 70
    a. Get ticket (20) => 80
706 → b. Get first entry ticket (OBJECT_X) => 70
    c. Ticket_a < ticket_b => No
    d. Insert key OBJECT_X.69.W in KDS 230

FIG. 7

KEY TICKETING SYSTEM WITH LOCK-FREE CONCURRENCY AND VERSIONING

TECHNICAL FIELD

The present disclosure generally relates to large-scale data storage using a key ticketing system. In a more particular non-limiting example, the present disclosure relates to a key ticking system that operates with lock-free concurrency and enables versioning.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have access to a variety of useful applications nearly constantly. Using such applications results in the generation of an increasingly huge amount of data. Storing and retrieving the produced data efficiently is a significant challenge.

Some solutions use a metadata database (DB) or key value stores (KVSs) in a large-scale decision support systems (DSSs) to provide scalability in an attempt to accommodate the current growth in data. These types of distributed, large-scale DSSs generally require that high levels of consistency be maintained in the metadata DB or KVS with a minimal impact on the responsiveness, particularly when querying ordered subsets of the keys of the DB.

In an attempt to meet these demands, some existing KVSs, such as LevelDB™, store keys and values in arbitrary byte arrays that can be quickly queried, and provide various versioning mechanisms. However, such systems do not support sharding, and the data stored by such KVSs often quickly outgrow available storage capacity and require a distributed architecture be used, which can limit scalability.

Further, in various large-scale distributed data storage systems, two or more concurrent requests by two or more different clients could lead to conflicting entries in the metadata DB or KVS. To address this, some systems use a database locking mechanism when processing concurrent requests that the systems may receive from disparate clients. While such a database locking mechanism can prevent inconsistencies when more than one user wants to access or update a particular file or object at the same time, it does so with significant expense, such as increasing the latency, processing overhead, and complexity of the data storage systems.

Additionally, in such large-scale distributed systems, system clock mismatches can occur amongst different clients, which can make it difficult to determine whether the state of an object in the metadata DB or KVS is actually the most recent state, and not a state that erroneously appears as the most recent due to a clock mismatch between the clock of the client and that of the system comprising the metadata DB or KVS.

SUMMARY

The present disclosure generally relates to a novel key ticketing system providing efficient concurrency and versioning without the limitations of existing solutions, such as those discussed in the Background. According to one innovative aspect, a computer-implemented method comprises receiving a first request associated with a first object storage operation. The first request includes a first timestamp associated with the first object storage operation and a first object identifier identifying a first object associated with the first object storage operation. The method further comprises calculating a first inverse timestamp based on the first timestamp and generating a first object key corresponding to the first object storage operation. The first object key includes at least the first object identifier and the first inverse timestamp. The method further comprises inserting a first entry including the first object key into a key data store at a position relative to other object key entries based on the first object identifier and the first inverse timestamp included in the first object key. The key data store comprises an ordered set of object key entries including the other object key entries where each of the object key entries of the ordered set is associated with a corresponding object storage operation.

These and other implementations may optionally include one or more of the following features: that the ordered set of object key entries is ordered based at least in part on object identifiers and inverse timestamps respectively included in object keys of the object key entries of the ordered set; that the ordered set of object key entries is ordered alphanumerically; receiving a second request concurrently with the first request where the second request is associated with a second object storage operation, the second request includes a second object identifier that is the same as the first object identifier, a second inverse timestamp associated with the second object storage operation is the same as the first inverse timestamp, and the first object storage operation and the second object storage operation are executed by different clients at the same time for the same object; determining a unique client identifier for the first request; determining a unique client identifier for the second request; generating a second object key corresponding to the second object storage operation, the second object key including at least the second object identifier, the second inverse timestamp, and the unique client identifier of the second request; that the first object key further includes the unique client identifier of the first request; inserting a second entry including the second object key into the key data store at a position based on the second inverse timestamp, the second object identifier, and the unique client identifier of the second request; querying the key data store for object key entries containing the first object identifier; determining that none of the object key entries of the ordered set contains the first object identifier or that, from the ordered set of object key entries, a most-recent entry containing the first object identifier has an inverse timestamp that is greater than the first inverse timestamp; querying the key data store for object key entries containing the first object identifier; determining that, from the ordered set of object key entries, a most-recent entry containing the first object identifier has an inverse timestamp that is less than the first inverse timestamp; that calculating the first inverse timestamp further comprises adjusting the first inverse timestamp to have a value less than the inverse timestamp of the most-recent entry; that calculating the first inverse timestamp further comprises determining a reference timestamp for the ordered set of object key entries and calculating the first inverse timestamp by subtracting a first timestamp value from the reference timestamp; that generating the first object key corresponding to the first object storage operation further comprises appending the first inverse timestamp to the first object identifier as a suffix; and that the first object key corresponding to the first object storage operation further includes an operation type.

Other aspects include corresponding methods, systems, apparatus, and computer program products for these and other innovative aspects. For example, one aspect may include a system comprising a key data store comprising an ordered set of object key entries, where each of the object key entries of the ordered set is associated with a corresponding object storage operation, and a storage application executable by the one or more processors to perform operations comprising: receiving a first request associated with a first object storage operation, where the first request including a first timestamp associated with the first object storage operation and a first object identifier identifying a first object associated with the first object storage operation; calculating a first inverse timestamp based on the first timestamp; generating a first object key corresponding to the first object storage operation, where the first object key includes at least the first object identifier and the first inverse timestamp; and inserting a first entry including the first object key into the key data store at a position relative to other of the object key entries of the ordered set based on the first object identifier and the first inverse timestamp included in the first object key.

Another such aspect may include a system comprising means for storing an ordered set of object key entries, where each of the object key entries of the ordered set is associated with a corresponding object storage operation; means for receiving a first request associated with a first object storage operation, where the first request includes a first timestamp associated with the first object storage operation and a first object identifier identifying a first object associated with the first object storage operation; means for calculating a first inverse timestamp based on the first timestamp; means for generating a first object key corresponding to the first object storage operation, where the first object key includes at least the first object identifier and the first inverse timestamp; and means for inserting a first entry including the first object key into the means for storing the ordered set of object key entries at a position relative to other of the object key entries of the ordered set based on the first object identifier and the first inverse timestamp included in the first object key.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1A is a diagram illustrating an example key data store.

FIG. 1B is a diagram of an example object key naming structure.

FIG. 1C is a diagram showing an example ordered set of object key entries.

FIG. 7 depicts further non-limiting example scenarios related to the method of FIG. 6.

DETAILED DESCRIPTION

Figure 2:
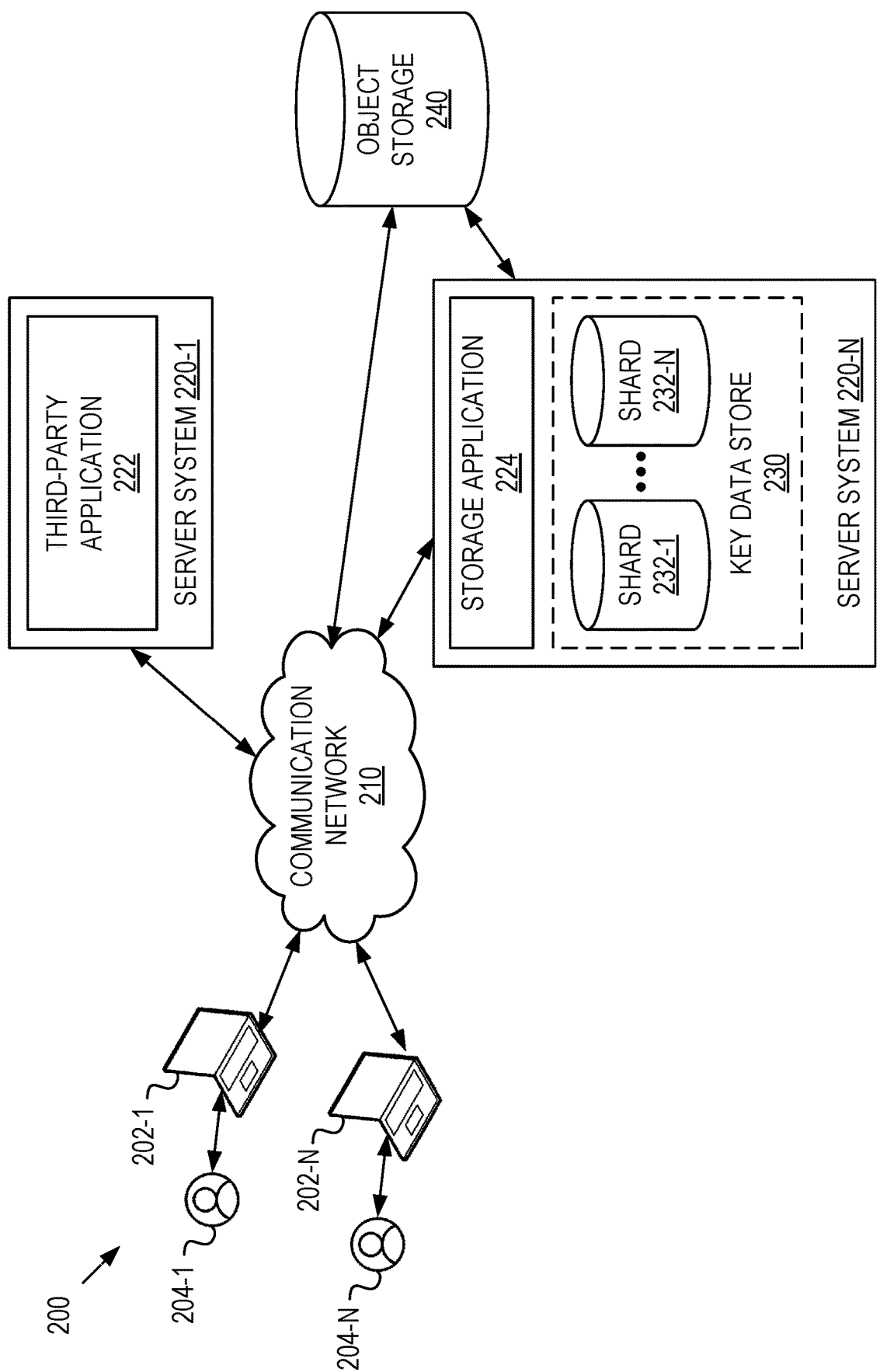
FIG. 2 is a block diagram of an example key ticketing system.

The present disclosure describes a novel key ticketing technology, which may include methods, systems, apparatuses, computer program products, and other aspects, that utilizes a key data store (e.g., database, key-value store (KVS), etc.). The technology is advantageously scalable and does not require multi-key transactions in order to guarantee consistency.

As a non-limiting overview, the technology can store keys in the key data store in a novel, ordered way that improves responsiveness when processing operations (e.g., read requests). The key data store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key data store may be sharded or distributed.

FIG. 1A is a diagram illustrating an example key data store 102, which comprises a plurality of shards S1 . . . SN. While two shards S1 and SN are shown, it should be understood that any suitable number of shards may be included. Each shard stores an ordered subset of object key entries. For example, shard S1 is shown as storing the subset of object key entries 106-1 (e.g., keys A-G) and shard SN is shown as storing the subset of object key entries 106-N (e.g., keys H-N). The subsets 106-1 through 106-N comprise the ordered set of object key entries 104.

Further, as shown in FIG. 1A, each key (e.g., A . . . N, etc.) can correspond to a data instance (e.g., $D_A \ldots D_N$). The data instance may comprise a pointer to a location where the actual object data is stored (e.g., in a separate database, on a physical drive, etc.), or other suitable data values. Each key corresponds to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

A key (also referred to as an object key) may be generated using an object key naming structure. FIG. 1B is a diagram of an example object key naming structure 120. As shown, a key may comprise a combination of a plurality of key components, such as, but not limited to, an object identifier and an inverse time value. More particularly, as shown, example components include a prefix 122, an object ID 124, a suffix 126, and a type 128, although it should be understood that other dimensions are possible and contemplated, and could vary based on implementation.

The prefix 122 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

The object identifier (ID) 124 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two sequential operations associated with the same object are recorded in the key data store in inverse order, with the most-recent operation being represented first (ahead of the less recent operation).

Additional suffix(es) may be appended, such as, but not limited to, an operation type, such as type 128. The type 128 may comprise an identifier of the type of object storage operation that is represented by the object key. In some embodiments, a given operation may be denoted by a corresponding value, such as, but not limited to, unique character or character string, and the type 128 may include that value. Example object storage operations include read, write, delete, update, etc. As a further example, write and update operations may be represented by a given identifier (e.g., "W"), a delete operation may be represented a given identifier (e.g., "K"), etc., and so forth. While in some example embodiments, write and update operations may be recorded as the same type of operation, in further embodiments they may be differentiated.

FIG. 1C is a diagram showing an example ordered set of object key entries 130. As shown, the set 130 includes two keys 132-1 and 132-2 representing two sequential write operations. In this example, key 132-1 includes an operation timestamp of 20 milliseconds (ms), the key 132-2 includes an operation timestamp of 10 ms, and the ticketing technology uses an example reference timestamp of 100 ms. It should be understood that the timestamp values used are provided by way of example to make the examples provided herein clear, and any suitable timestamps may apply, such as a POSIX timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps decrease for the operations executed over time. For instance, an inverse timestamp for a given operation is calculated by determining the difference between the operation timestamp and the reference timestamp). In particular, continuing the above example, for key 132-1, the inverse timestamp is 80 (100−20=80), and for write operation 132-N, the inverse timestamp is 90 (100−10=90).

By ordering the entries in the key data store (and the operations embodied thereby) relating to the same data object using at least the inverse timestamps, subsequent operations relating to that data object are arranged in entries in the ordered key data store with the most-recent operation being represented first. For instance, as shown in FIG. 1C, key 132-2, which represents an operation having an inverse timestamp of 90, is older than key 132-1, which represents a more recent operation having a timestamp of 80. As a result, an entry comprising key 132-1 is ordered ahead of an entry comprising key 132-2 in the ordered set 130 because key 132-1's inverse timestamp is lower (80 versus 90).

By way of further example, during a subsequent query, retrieval of the most-recent entry from the ordered set of object key entries (e.g., in this example, the entry comprising key 132-1) can be performed efficiently (e.g., by the key data store controller 320, see FIG. 3) because retrieval of the first entry in the ordered set for a given object (e.g., OBJ_NAME) does not require iteration through entries associated with that object. Rather, by way of illustration, such a retrieval may consume equivalent computational resources as that of an exact lookup of a single key for that object.

Versioning of an object includes the tracking and preservation of more than one version of the object as the object changes over time, and allows for the archival of the different versions of the object as they occur over time (e.g., due to modifications made over time to the object), retrieval of a prior version of the object, and/or recovery from unintended overwrites and/or deletions made to the object.

Advantageously, using the inverse timestamps as suffixes allows versioning of an object to be achieved in a scalable way without impacting performance of single key read operations, and without impacting the design or configurations of the key data store and/or its shards.

The ticketing technology can also provide for lock-free concurrency. As discussed further below, the ticketing technology may do so by including a suffix in the key that identifies the particular client making the object storage request. The key's client identifier advantageously allows the ticketing technology to handle concurrent object storage requests of different clients, which are issued at exactly the same time, without having to revert to performance reducing lock mechanisms.

The key data store may be implemented a distributed environment, such as the client-server key ticketing system 200 depicted in FIG. 2. As shown, the system 200 can include client systems (e.g., client systems 202-1 and 202-N), server systems (e.g., server systems 220-1 and 220-N), a key data store 230, and an object storage 240. These components 202, 220, 230, and/or 240 may be interconnected via a communication network 210. For simplicity in some cases, depending on context, the client systems 202-1 and 202-N may also be referred to herein individually or collectively as client system 202 or client 202, and the server systems 220-1 and 220-N may be referred to herein individually or collectively as server system 220 or server 220.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application 222 and/or storage application 224, such as an application adapted to configure and/or utilize programming interfaces of the storage application 224. In some embodiments, the third-party application(s) 222 hosted by the server system 220-1 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 220 may send/receive requests and/or send/receive responses, such as but not limited to HTTP(S) requests/responses, to/from one another. A client system 202 may present information, such as visual, audio, tactile, and/or other information via output devices, such as displays, audio reproduction devices, vibration mechanism, etc., based on information generated by client system 202 and/or received from a server system 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application 222, etc.) may send a request (also referred to as an object storage request) to the server system 220 to store, update, delete, or retrieve a particular file stored at the server system 220-N through the communication network 210. For example, a user 204 may update a document using a word processing application and may save the updated version to the server system 220-N, in which case the word processing application transmit a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request an object or portion thereof, a list of objects matching certain criteria, etc., in which case the request may include corresponding information (e.g., an object identifier, search criteria (e.g., time/date, keywords, etc.), and receive an object list or the object itself from the storage application 224. Numerous other use cases are also applicable and contemplated.

As shown in FIG. 2, the server system 220-N may include a storage application 224 and may be coupled to and/or include a key data store 230. The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such software and/or hardware interfaces (e.g., application programming interface(s) (API(s)), that may be accessed (e.g., locally, remotely, etc.) by components of the system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

The key data store 230 may comprise a database that stores an ordered set of object key entries, as discussed in further detail elsewhere herein. In some embodiments, the key data store 230 may comprise a horizontally partitioned database having two or more shards 232-1 . . . 232-N, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof.

The server system 220-N may be coupled to and/or include an object storage 240. The object storage 240 comprises one or more data stores for storing data objects. The object store 240 may implemented across a plurality of physical storage devices. In some example embodiments, the plurality of physical storage devices may be located at disparate locations. Objects stored in the object storage 240 may be referenced by object key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some implementations, the key data store 230 and/or the object storage 240 may be incorporated with the memor(ies) 304 or may be distinct therefrom. In some implementations, key data store 230 and/or the object storage 240 may store data associated with a database management system (DBMS), such as one comprised by and/or controlled by the storage application 224 (e.g., the key data store controller 320, the storage service 322, etc., see FIG. 3) and/or other components of the system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 200 may be integrated into a single computing device or system or additional computing devices or systems, etc.

Figure 3:
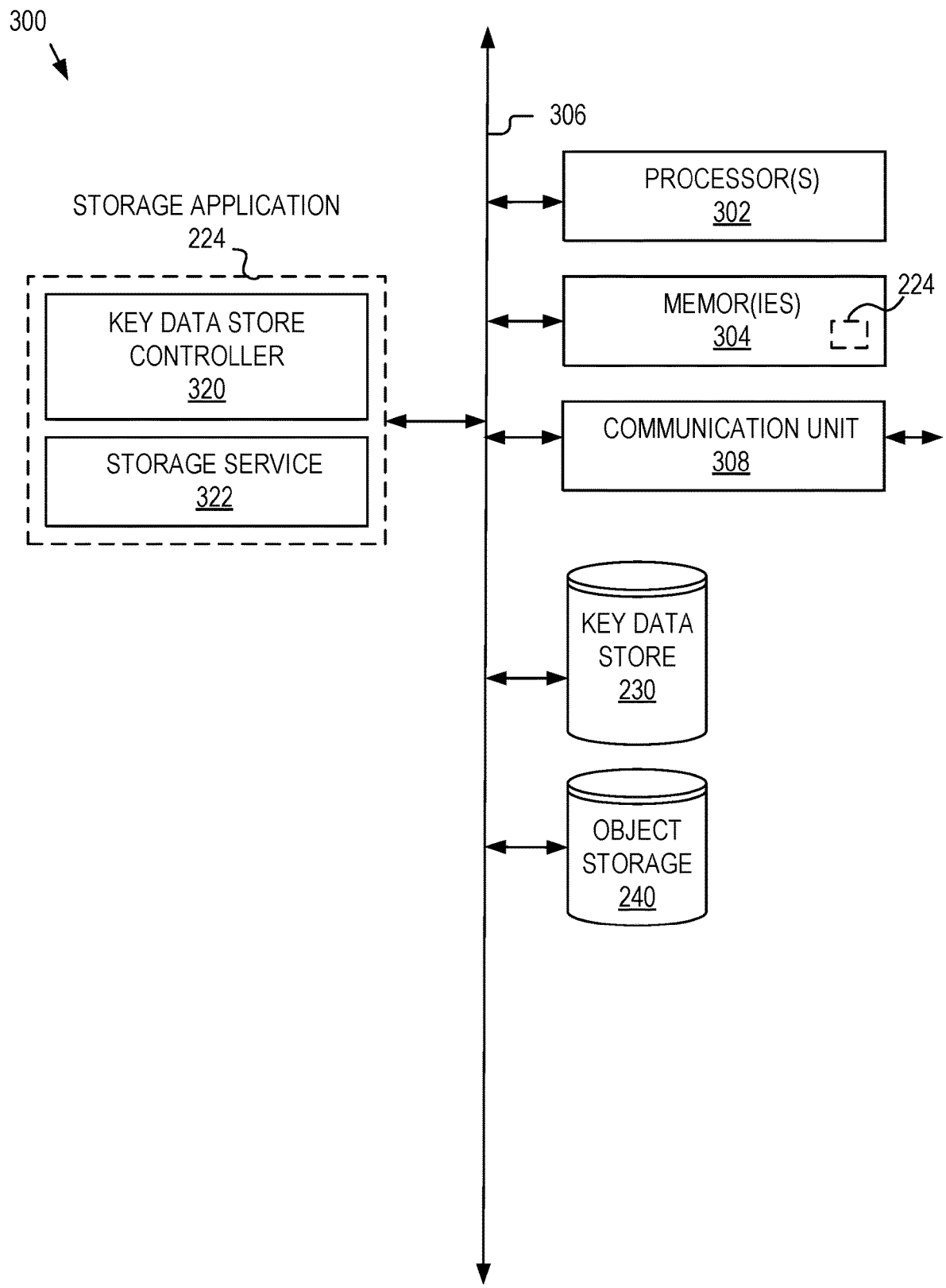
FIG. 3 is a block diagram of an example computing system.

FIG. 3 is a block diagram of an example computing system 300. In some embodiments, the computing system 300 may represent a server instance or collection of instances, such as the server system 220-N. In some embodiments, the computing system 300 may reflect other computing systems, such as a client system 202, a dedicated storage system, etc. The computing system 300 may comprise and/or be coupled to one or more processors 302, one or more memories 304, one or more communication units 308, a key data store 230, and an object storage 240. The computing system 300 further includes an instance of the storage application 224. The components of the computing system 300 can be communicatively coupled by a bus 306. In some embodiments, the key data store 230 and/or the object storage 240 may be implemented in a separate computing system and may be coupled to the computing system 300 via the communication unit 308. In such embodiments, the storage application 224, or aspects thereof, may be implemented in the separate computing system (e.g., as a distributed or local application, etc.)

As shown in FIG. 3, the storage application 224 includes a key data store controller 320 and storage service 322, although it should be understood that the depicted storage application 224 architecture is provided by way of illustration, and that the storage application 224 may include other components and/or include other component hierarchies, and/or that the foregoing components and/or their acts and/or functionality may be combined or segmented into further components, etc.

The storage application 224, and/or its sub-components, such as, but not limited to, the key data store controller 320 and/or the storage service 322 may be implemented in hardware and/or software. For instance, the storage application 224, and/or one or more of its sub-components, may include hardware and/or software logic executable by the computing system 300. In some embodiments, the storage application 224, and/or one or more of its sub-components, may comprise sets of instructions executable by the processor(s) 302 to provide their functionality. In some embodiments, the storage application 224, and/or one or more of its sub-components, are stored in the memor(ies) 304 of the computing system 300 and are accessible and executable by the processor(s) 302 to provide their functionality. In any of the foregoing implementations, the storage application 224, and/or one or more of its sub-components, may be adapted for cooperation and communication with the processor(s) 302 and other components of the computing system 300.

In further implementations, the storage application 224, and/or one or more of its sub-components, may include specially configured software stored in the memor(ies) 304 and executable by the processor(s) 302 so as to configure the processor(s) 302. In some embodiments, the storage application 224, and/or one or more of its sub-components, may include logic gates, switches, application specific integrated circuitry (ASIC), a programmable logic controller, an embedded microcontroller, and/or other suitable hardware, etc. In further embodiments, the storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

The key data store controller 320 comprises logic executable to manage the key data store 230. For instance, the key data store controller 320 maintains the integrity of the ordered set of object key entries, generates new object keys, stores new entries, retrieves existing entries, and manages concurrency, etc.

The key data store controller 320 can maintain the entries stored in the key data store 230 as an ordered set of object key entries. As discussed elsewhere herein, such as with reference to FIGS. 1A-1C, the ordered set of object key entries may first group the entries using at least an object identifier component of the key, and then group the entries corresponding to each name in order of most-recent to least recent using an inverse time component of each of the keys. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, referring to FIG. 1C, key 132-1 is first because the inverse timestamp of 80 comprising a portion of the character string of that key is lower than the inverse timestamp of 90 comprising a portion of the character string of the subsequent key of entry 132-2. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

The key data store controller 320 stores entries in the key data store 230 reflecting data manipulation operations performed on objects (e.g., read, modify, write, etc.). Entries may be stored responsive to object storage requests received by the storage service 322, such as but not limited to, put, get, delete, list, etc. The storage service 322 may be coupled to the key data store controller 320 to instruct the key data store controller 320 to record the data manipulation operations. For example and not limitation, in a software embodiment, the storage service 322 can call corresponding methods of the key data store controller 320 configured to perform the various functions and acts described herein. An instruction received form the storage service 322 may comprise a new key entry request that includes components for generating the key, and in some embodiments, data corresponding to the key.

By way of example, when recording a write, update, delete, etc., operations, the key entry request received from the storage service 322 may include key-related data for generating the key, and a corresponding data instance (e.g., data value) for storage in association with the key. Responsive to receiving the storage instruction from the storage service 322, the key data store controller 320 computes an inverse timestamp using the key-related data, generates the key using the inverse timestamp, the object identifier, etc. (e.g., a prefix, an operation type, etc.), and stores a new entry comprising the generated key and the data instance in order of recency, as described elsewhere herein.

Continuing the foregoing example, the key data store controller 320 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by the key data store controller 320 (e.g., using a clock of the local system, issuing a call to the operating system, etc.). For instance, the object storage request received and processed by the storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, the key data store controller 320 assigns a timestamp to a requested object storage request based on the clock at the server system 220. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to the key data store 230 and the foregoing new entry becomes less recent. This advantageously allows for scalable and flexible versioning of a data object.

An operation type component included in the key generated by the key data store controller 320 may reflect the operation performed on the object, and may be used to record the lifecycle of the object over time (when it was initially created, modified, deleted, etc.).

As another example, when performing a read operation (e.g., responsive to receipt of a list request), the instruction data received from the storage service 322 may include key-related search terms that are used for querying the key data store 230. For example, the search term(s) may comprise an object identifier or portion thereof, and the key data store controller 320 may query the ordered set of object key entries in key data store 230 based on it and return a corresponding result set. Additional or alternative search term(s) may include, but are not limited to, data describing a domain, bucket, timestamp, operation type, etc., and the key data store controller 320 may query the ordered set of object key entries in the key data store 230 based on them and return a corresponding result set.

In some cases, the result set may be ordered in inverse order beginning with the most-recent entry first and the oldest entry last, which mirrors the order in the ordered set of object key entries of the key data store 230, although the result set could be ordered in other ways depending on implementation.

In some embodiments, further key components may be included in the instruction from the storage service 322 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

Advantageously, the key data store controller 320 can manage recording concurrent data storage-related operations for the same object without having to lock the key data store 230, as discussed in further detail below with reference to at least FIG. 6.

The storage service 322 comprises computer logic executable to process object storage requests. The storage service 322 may receive requests from local applications and/or remote applications. An application that sends storage requests to the storage application 224 is referred to herein as a client application. The storage service 322 can process the requests and transmit corresponding responses, which may include confirmation data confirming a successful execution of a storage-related operation, response data reflect results of a query-based request, and/or error information reflecting any errors that were encountered, etc. In further embodiments, the functionality of the storage service 322 may be included in the key data store controller 320, in which case the key data store controller 320 may receive and process the object storage requests.

In some embodiments, the storage service 322 may include a request handler that receives and parses object storage requests from client applications, such as a client application operating on various client systems 202, server systems 220, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), etc. The storage service 322 may parse the data from the request and process it accordingly.

For example, responsive to receiving a request, the storage service may implement the requested object storage operations in the object storage 240. For example, the storage service 322 may read, write, update, and/or otherwise manipulate objects in the object storage 240 based on parameters of the request. For instance, if the request is a write request that stores a new object to the object storage 240, the storage service 322 may write the new object to the object storage 240.

The storage service 322 may interact with the key data store controller 320 to store and retrieve data from the key data store 230. To do so, in some cases, the storage service 322 can issue various instructions to the key data store controller 320, such as but not limited to instructions comprising put, get, delete, list, request, etc.

In some embodiments, in conjunction with the implementation of an object storage operation, the storage service 322 may request that the key data store controller 320 store a new entry reflecting the operation responsive to receiving the object storage request from a client. As discussed elsewhere herein, each ticket/entry stored in the key data store 230 may be associated with an object storage operation performed at a particular point in time in association with an object in the object storage 240.

By way of further example and not limitation, the storage service 322 may request that the key data store controller 320 store an entry in the key data store 320 that corresponds with an operation being performed on a corresponding object in the object storage 240. For instance, in association with writing a new object to the object storage 240, the storage service 322 may request that the key data store controller 320 store a new entry comprising a corresponding object key (that includes the object identifier, inverse timestamp, etc.) and object reference in the key data store 230. Alternatively, when an object is deleted from the object storage 240, the storage service 322 can request that the key data store controller 320 store an entry in the key data store 230 reflecting deletion of that object, as discussed elsewhere herein. In association with that instruction, the storage service 322 may or may not delete some or all instances of the object data from the object storage 240 depending on the data retention protocol.

In some embodiments, the storage service may instruct the key data store controller 320 to query the key data store 230 for one or more entries matching query criteria included in the request. For instance, responsive to receiving the request, the key data store controller 320 may query the operations associated with a particular object by querying the key data store 230 for the ordered keys associated with the object (e.g., using the object identifier, etc.), and return a result set to the storage service 322 for provision to the requester.

The storage service 322 may be coupled to the key data store controller 320, and interact with the key data store controller 320 to store and retrieve data from the key data store 230. The storage service 322 may be coupled to the key data store controller 320, and interact with the key data store controller 320 to store and retrieve data from the key data store 230.

In some embodiments, the storage service 322 may allocate space in the object storage 240 to store immutable objects. The storage service 322 may also determine and provide (e.g., to the key data store controller 320) a link or pointer to the location of the object for use in an object key associated with the object. Similarly, if a particular object or version of an object is requested by a client system (e.g., client system 202 in FIG. 2), the storage service 322 may determine where the object is stored in the object storage 240, retrieve it, and transmit it.

The methods of FIGS. 4-7 are now described. With reference to these methods, each of the operations shown and/or described may correspond to instructions stored in a computer memory or computer-readable storage medium, a customized logic chip, or other suitable implementation as discussed elsewhere herein.

Figure 4:
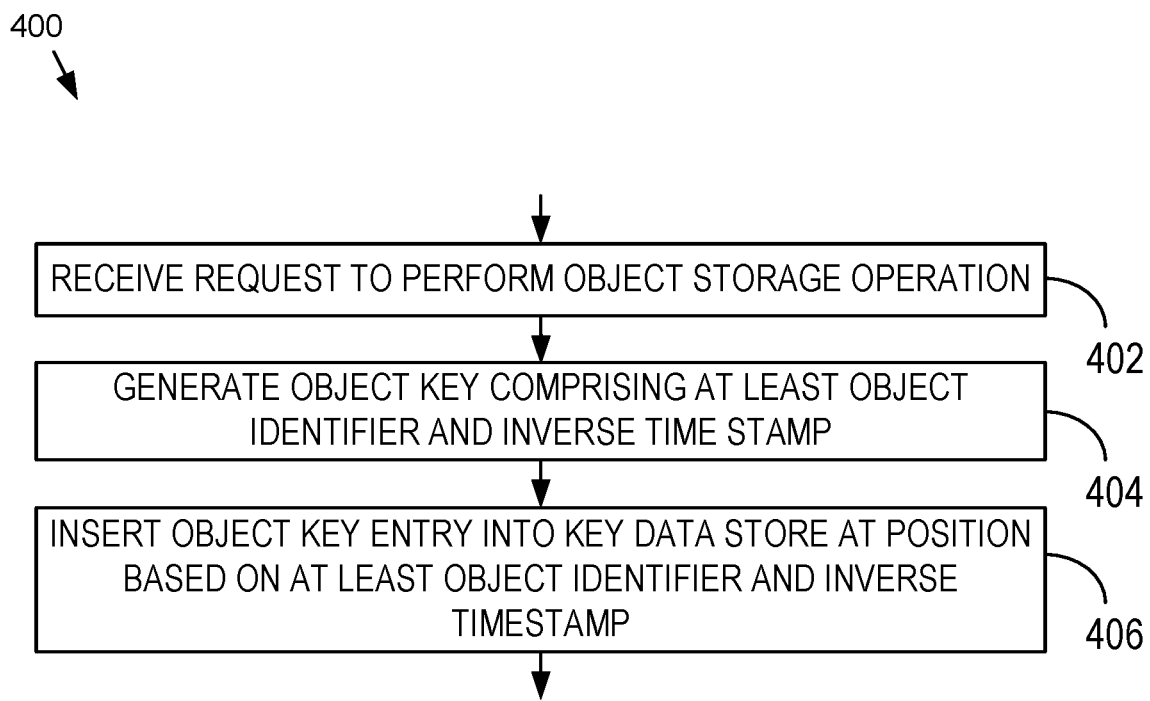
FIG. 4 is a flow chart of an example method for generating and inserting an object key.

FIG. 4 is a flow chart of an example method 400 for generating an object key. In block 402, the storage service 322 receives an object storage request to perform an object storage operation with respect to an object. As discussed elsewhere herein, potential object storage operations may include, but are not limited to, adding an object to an object storage database (e.g., object storage 240 in FIG. 2), updating an object, or deleting or removing the object from the database. In some example embodiments, the object storage requests may be received from a client application (e.g., word processing application, spreadsheet application, photo editing application, any other application configured to manipulate objects, etc.).

In response to receiving an object storage request, the key data store controller 320 can generate an object key for the requested object storage operation in block 404. As discussed elsewhere herein, the object key is comprised of at least an object identifier of the object to which the requested object storage operation relates, and an inverse timestamp associated with the operation. In some embodiments, to compute the inverse timestamp, the key data store controller 320 can determine the difference between an operation timestamp and a reference timestamp.

As described elsewhere herein, the operation timestamp may reflect a local timestamp of the computing system involved with performing the operation (e.g., a client or server system that triggered the operation (e.g., responsive to a user input modifying an object, an automated procedure or program that modified the object, etc.), the server system implementing the operation (e.g., such as the server system hosting the storage application 224), etc. The reference timestamp may reflect a reference time value used to calculate the inverse timestamp, as described elsewhere herein. In some embodiments, the reference timestamp may be predetermined, stored in memory, and retrieved by the key data store controller 320 to perform the calculation. By way of further example, the inverse timestamp may be computed by subtracting the operation timestamp from the reference timestamp. For example, if the reference timestamp is 100 milliseconds and the operation timestamp is 65 milliseconds, the inverse timestamp would be equal to 100−65=35.

In some embodiments, when generating the object key, the key data store controller 320 can append the inverse timestamp to the object identifier as a suffix. For instance, an example object identifier may be Object1 and an example inverse timestamp may be 30, in which case at least a portion of the object key comprises a value combining Object1 and 30 (e.g., Object130, Object1_30, Object1.30, etc. In some cases, a delimiter may be used to separate the constituent components of the object key. The delimiter may comprise any suitable symbol or sequence of symbols. For example, the delimiter may comprise a period, in which case the foregoing example object key would be Object1.30. Continuing this example, a subsequent operation is performed on the object where the inverse timestamp is computed to be 20. In this case, the object key comprises Object1.20 as at least a part of its name, and when inserted into the key data store 230 (e.g., see block 406), would be positioned ahead of Object1.30 because of the difference between the inverse timestamp components (e.g., 20<30).

The object key can append one or more additional suffixes and prepend one or more additional prefixes to further differentiate between entries and/or sort/group entries, such as a domain identifier, bucket identifier, client identifier, operation type, etc., as discussed in further detail elsewhere herein. The sequence of the suffixes and prefixes can vary depending on further grouping and sorting needs in some cases, and may be delimited, as described elsewhere herein.

In block 406, the key data store controller 320 may insert the generated object key into the ordered set of object key entries based on the generated object key, which situates the object key ahead of other object keys related to that object. More particularly, as discussed elsewhere herein, the key data store controller 320 may store the object keys as an ordered set (e.g., comprised of ordered subsets when sharded) of object key entries using the unique object keys, which respectively comprise inverse timestamps and other key naming component(s) (e.g., prefix(es), suffix(es), etc.) corresponding to the individual operations that they represent.

The object key entry inserted into the key data store 230 may comprise the generated object key and a corresponding data instance (e.g., value). The key data store controller 320 can index the data instance, query the data instance, and/or retrieve the data instance using the object key. By way of non-limiting example, the data instance may comprise a reference to a storage location of the object data instance in the object storage database. As an object is manipulated by the storage service 322 over time, the object is versioned by virtue of storing iterative object instances in the object storage database. Correspondingly, for each operation performed on the object, a corresponding entry is logged in the key data store 230 in reverse order based on the inverse timestamp. When the most-recent object key for a particular object is requested, the storage service 322 can efficiently retrieve the first object key entry that it encounters as it traverses the key data store 230 because that object key entry reflects the most-recent state/version of the object (reflects the most-recent operation performed on the object). The following is a further non-limiting example demonstrating the insertion of an object key entry into the key data store 230. In this simplified example, assume the ordered set of object key entries comprises at least the following sequence of object keys, where each key has the following naming structure [object identifier in quotes].[inverse timestamp].[operation type]:

"K1". 90.W
"K2". 80.W
"K2". 90.W
"K3". 80.W
"K3". 90.W
"K4".70.K
"K4". 80.W
"K4". 90.W
"K5". 70.W
"K5". 80.W
"K5". 90.W

If a new object key for object "K3" is added to the ordered set of object key entries, where the inverse timestamp of that key is 55, the ordered set of object key entries would then be as follows:

"K1". 90.W
"K2". 80.W
"K2". 90.W
"K3". 55.W
"K3". 80.W
"K3". 90.W
"K4". 70.K
"K4". 80.W
"K4". 90.W
"K5". 70.W
"K5". 80.W
"K5". 90.W

Figure 5:
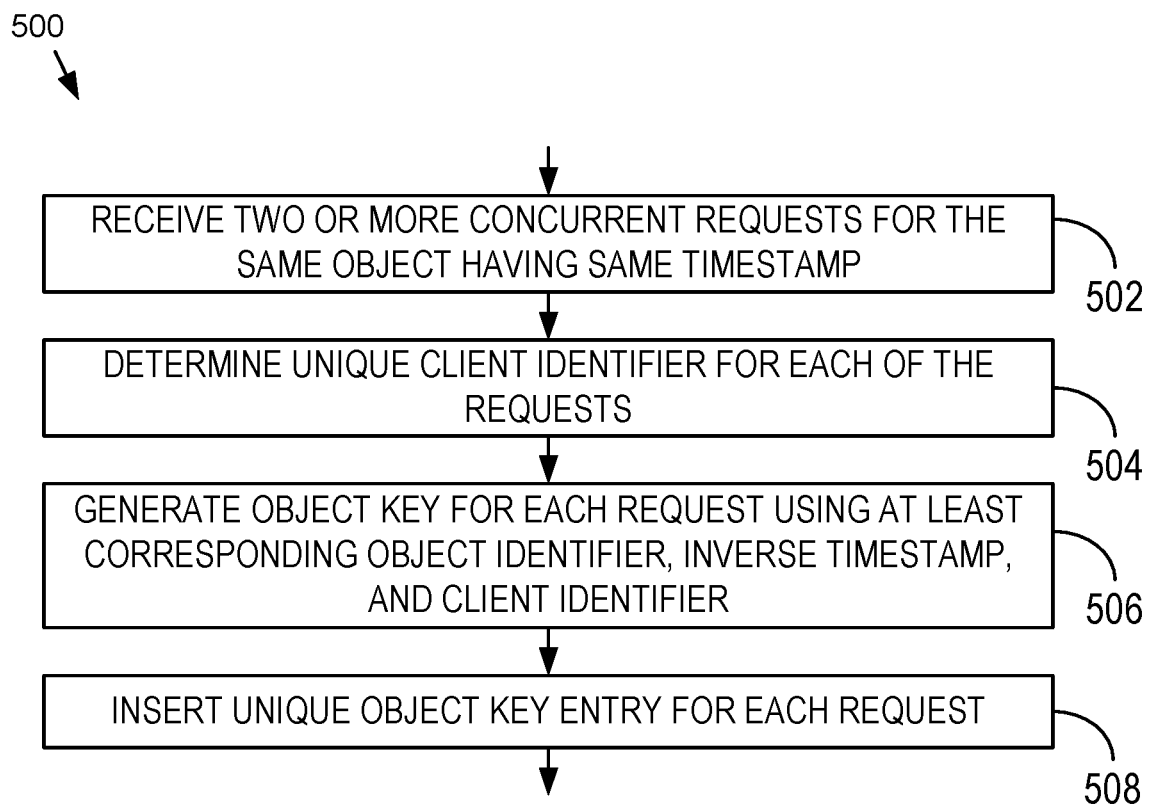
FIG. 5 is a flowchart of an example method for lock-free processing of concurrent requests

FIG. 5 is a flowchart of an example method 500 for lock-free processing of concurrent requests. In block 502, the key data store controller 320 receives two or more concurrent new entry request for the same object. The concurrent new entry requests may instruct the key data store controller 320 to insert entries based on the same object identifiers and timestamps. For example, the concurrent requests may reflect concurrent write operations issued at the exact same time by multiple clients. The concurrent write operations may be received and processed by the storage service 322, and in response, the storage service 322 may send the concurrent new entry requests to the key data store controller 320. In further embodiments, the key data store controller 320 may receive and process the write operations directly from the clients, as discussed in further detail herein.

In response, in block 504, the key data store controller 320 can determine a unique client identifier for each of the requests concurrently received for the same object, which include the same timestamp and any other aspects (operation type, domain, etc.). In some embodiments, each of the concurrent requests is associated with a different client, and the request may include a unique client identifier that identifies the client. An example client identifier may comprise a globally unique identifier (GUID), a device identifier (e.g., MAC address, a device type, model, etc.), an electronic address (e.g., Internet protocol (IP) address), a user identifier (e.g., email address, user name, etc.), an application identifier (e.g., serial number, unique application ID, etc.), and/or any other suitable identifier for unique identifying the client performing operation on the object.

In block 506, the key data store controller 320 generates a unique object key for each request using at least the corresponding object identifier, the corresponding unique client identifier, the inverse timestamp, and any other naming components (e.g., operation type, domain, etc.). The key data store controller 320 calculates the inverse timestamp using the timestamp from block 502, in a manner consistent with that discussed elsewhere herein.

In block 508, the key data store controller 320 inserts each of the unique object keys in the key data store 230, as discussed elsewhere herein.

The method 500 advantageously allows the system 200 to elegantly handle concurrent requests of different clients, which are issued at exactly the same time for the same object. To further illustrate, the following additional example is provided. Assume client X issues a write request at timestamp $TS_X=20$ ms for data object "OBJ NAME," and client Y also issues a concurrent write request at exactly the same timestamp $TS_Y=20$ ms for the same data object "OBJ NAME". Further, assume the unique identifier for client X is a GUID having a value "GUIDX" (which is included in the write request issued by it), and the unique identifier for client Y is a GUID having a value "GUIDY" (which is included in the write request issued by it).

The keys generated by the key data store controller 320 for key entries corresponding to these write requests each include a unique suffix that identifies the particular client making the request, such as that client's GUID.

By way of example, in which any additional prefixes or suffixes are omitted for simplicity:

The key generated for the request of client X could be represented as "OBJ NAME".80. "GUIDX".W, where the value 80 is the inverse timestamp computed using $TS_X$ and a reference timestamp of 100 ms, and W reflects the write operation type.

The key generated for the request of client Y could be represented as "OBJ_NAME".80. "GUIDY".W, where the value 80 is the inverse timestamp computed using $TS_Y$ and a reference timestamp of 100 ms, and W reflects the write operation type.

As can be seen, the client identifier, which is appended after the inverse timestamp, differentiates the entries and can be used to distinguish the entries when inserted into the key data store 230. In this example, any other key components of the keys are the same. For instance, assume that prior to the receipt of the above requests, the key data store 230 contained an entry reflecting an operation that occurred at a timestamp value of 10 ms (an inverse timestamp of 90 using a reference timestamp of 100). Upon insertion, the following ordered sequence (which sequences the entries alphanumerically in this example) could result in a consistent way in the key data store 230:

"OBJ NAME".80.GUIDX.W (<-most-recent entry at TS 20 of client X)
"OBJ NAME".80.GUIDY.W (<-most-recent entry at TS 20 of client Y)
"OBJ NAME".90.GUID.W (<-older entry at TS 10)

As shown, the method 500 can guarantee consistency when such concurrent requests are received, and large-distributed systems can advantageously use the method 500 to achieve consistency without reverting to performance-reducing locking mechanisms.

Figure 6:
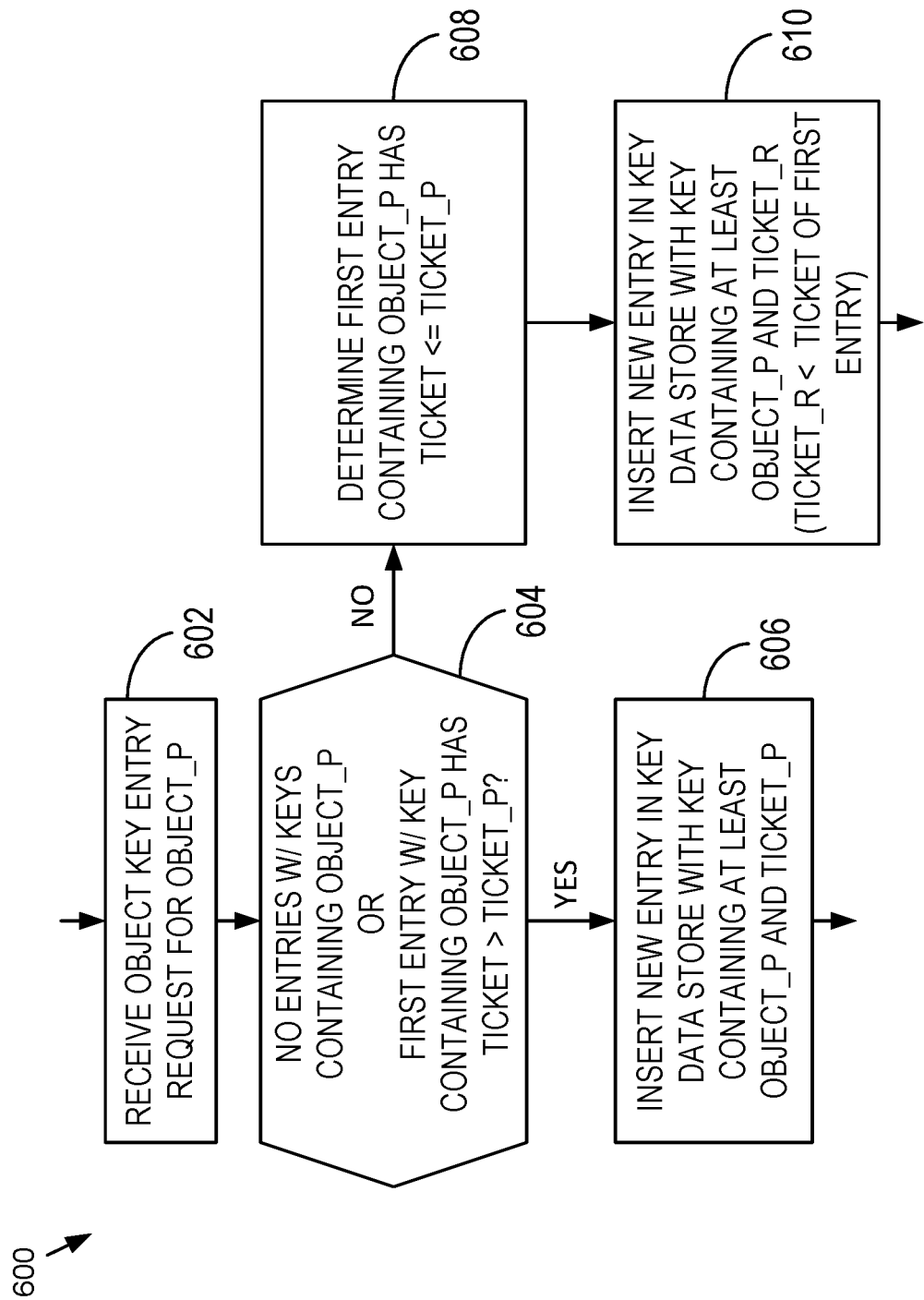
FIG. 6 is a flowchart of an example method for handling clock mismatches.

FIG. 6 is a flowchart of an example method 600 for handling clock mismatches. In block 602, the key data store controller 320 receives a request for a new object key entry for a particular object identified by the identifier OBJECT_P. As discussed elsewhere herein, the key data store controller 320 can use the operation timestamp included in the request to compute the inverse timestamp (referred to in this embodiment as TICKET_P) for the key of the new entry.

In block 604, the key data store controller 320 determines whether either of the following criterion are satisfied: 1) whether no entries exist in the key data store 230 with keys that contain OBJECT_P; or 2) whether a first entry (which is the most-recent entry for OBJECT_P) with a key containing OBJECT_P has a ticket value (TICKET) that is greater than TICKET_P. If either case is satisfied, then in block 606, the key data store controller 320 inserts the new key entry with a key containing at least OBJECT_P and the TICKET_P, as discussed elsewhere herein. Upon insertion, the entry is ordered ahead of any other entries with keys containing OBJECT_P (until any newer entries for OBJECT_P are logged).

If, in block 604, neither case is satisfied, the key data store controller 320 determines in block 608 that the first entry containing OBJECT_P has a ticket value (TICKET) that is less than or equal to TICKET_P. If so, in block 610, the key data store controller 320 inserts a new entry in the key data store 230 with a key that contains at least a representation of OBJECT_P and a revised/adjusted ticket value (TICKET_R) that has a value that is less than the ticket value of the first entry (TICKET). In some embodiments, the key data store controller 320 may compute the adjusted ticket value to be less than first entry (TICKET) by a given amount. In further embodiments, the key data store controller 320 may determine what timestamp was used to compute the ticket value of the first entry, and may select a later timestamp than the first entry timestamp to compute TICKET_R, which results in TICKET_R being less than TICKET (the ticket value of the first entry). Other variations are also possible and contemplated for computing the adjusted value.

FIG. 7 depicts further non-limiting example scenarios 700 related to the method of FIG. 6. In these scenarios, they key data store controller 320 includes at least the following example software functions, which are performed responsive to receiving a new entry request corresponding to a write request received by the storage service 322:

get ticket (timestamp), which executes a function f(timestamp). The function computes the inverse timestamp using the provided operation timestamp and a reference timestamp, as discussed elsewhere herein.

get first entry ticket (object id), which queries the key data store (KDS) 230 using the provided object id.

compare tickets (ticket 1, ticket 2), which determines whether a first ticket value is less than a second ticket value.

insert key (key, . . . ) which inserts a new entry in the KDS 230 containing the provided key (and corresponding data value(s) if applicable).

Scenario 702 reflects a case where no entry is found in the KDS 230 for a given object identifier, OBJECT_X. In 702(*a*), the key data store controller 320 executes the get ticket function using the timestamp value provided in the new entry request, which in this case is 20 ms, and results in a ticket value of 80. In 702(*b*), the key data store controller 320 executes the get first entry ticket function using OBJECT_X provided in the new entry request. The output reflects that no such entry was found in KDS 230, in which case the key data store controller 320, in 702(*c*), executes the insert key function using the provided key, OBJECT_X.80.W. The insert key function inserts a new entry in the KDS 230 using the provided key (which in order combines the object identifier, inverse timestamp, and operation type (W for write)).

Scenario 704 reflects a case where a first, most-recent entry is found in the KDS 230 for a given object identifier, OBJECT_X. In 704(*a*), the key data store controller 320 executes the get ticket function using the timestamp value provided in the new entry request, which in this case is 20 ms and results in a ticket value of 80. In 704(*b*), the key data store controller 320 executes the get first entry ticket function using OBJECT_X provided in the new entry request. The output reflects that a first entry ticket value of 90 was found in KDS 230. In response, in 704(*c*), the key data store controller 320 executes a compare ticket function to compare the ticket value from 704(*a*) with the ticket value from 704(*b*) to determine whether the ticket value from 704(*a*) is less than the ticket value from 704(*b*). If so, in 704(*d*), the key data store controller 320 executes the insert key function using the provided key, OBJECT_X.80.W. The insert key function inserts a new entry in the KDS 230 using the provided key (which in order combines the object identifier, inverse timestamp, and operation type (W for write)).

Scenario 706 reflects a case where a first, most-recent entry is found in the KDS 230 for a given object identifier, OBJECT_X, that has a ticket value reflecting a time inconsistency. In 706(a), the key data store controller 320 executes the get ticket function using the timestamp value provided in the new entry request, which in this case is 20 ms and results in a ticket value of 80. In 706(b), the key data store controller 320 executes the get first entry ticket function using OBJECT_X provided in the new entry request. The output reflects that a first entry ticket value of 70 was found in KDS 230. In response, in 706(c), the key data store controller 320 executes a compare ticket function to compare the ticket value from 706(a) with the ticket value from 704(b) to determine whether the ticket value from 706(a) is less than the ticket value from 704(b).

In comparison with scenario 704, the value in 706(a) is greater than the value in 706(b), which should not be because the current write operation occurred at a later point in time than the now previous, most-recent operation (which is represented by the first entry in the KDS 230). The key data store controller 320 detects this clock mismatch, and accounts for it in 706(d), where it executes the insert key function using an adjusted ticket value for the new entry so that the new entry is inserted before the current first entry, thereby making the current first entry the second entry and the new entry the new first entry. For instance, the key data store controller 320 may compute an adjusted ticket value for the new entry that is just less than the ticket value of the first entry. E.g., the adjusted ticket value may be computed using a predetermined offset (e.g., percentage, numerical value, etc.) and the ticket value of the first entry. In this example, the offset is 1 and the ticket value of the first entry is 70, resulting in 69 for the adjusted ticket value.

The logic described with reference to FIGS. 6 and 7 advantageously allows for a single operation by storage application 224, and allows for consistent handling of a request insertion of an entry for a key of a data object even with clock mismatch. Further, requests can be handled in a parallel way by the storage application 224, without requiring interaction with the client, thereby allowing for high performance scalability, while helping to further guarantee consistency.

To case understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 3, in some embodiments, the key data store controller 320 may determine that the number of object keys stored in the ordered set of object key entries exceeds a predetermined threshold. The threshold may reflect the amount of storage space that can be acceptably utilized (e.g., a percentage of utilized storage space relative to a maximum). Responsive to such a determination, the key data store controller 320 may add an additional shard, in which case the key data store controller 320 may redistribute the object keys between the shards to help ensure that the object keys are more evenly spread between the database shards. In some cases, the key data store controller 320 may update a range table to accurately represent which object keys are stored on which database shards. In further embodiments, the key data store controller 320 may create new shards or re-shard the existing database shards for additional reasons including, but not limited to, improve performance of key data store 230, compliance to rules/laws/regulations, security policies, and/or load requirements of the key data store 230, and/or other suitable purposes.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores. In some implementations, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memory(ies) 304 via a communication bus 306 to access data and instructions therefrom and store data therein. The bus 306 may couple the processor(s) to the other components of the computing system 300, for example, memory(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., RAM, ROM, flash, solid state drive, hard drive, optical disc, tape, magnetic diskette, etc.). It should be understood that the memor(ies) 304 may include a single device or may include multiple types of devices and configurations.

The communication unit 308 may include one or more interface devices for wired and wireless communication with the network 210 and the other entities and/or components of the system 200 including, for example, the client systems 202, server systems 220, object storage 240, etc. For instance, the communication unit 308 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 308 can link the processor(s) 302 to the network 210, which may in turn be coupled to other processing systems. The communication unit 308 can provide other connections to the network 210 and to other entities of the system 300 using various communication protocols, including, for example, those discussed elsewhere, herein. In some instances, the communication unit 308 includes a wired port and a wireless transceiver. The communication unit 308 also provides other connections to the network 210 for distribution of files and/or media objects using various network protocols, such as those discussed elsewhere herein.

In some embodiments, the computing system 300 may include a software communication mechanism implemented via the network 210 and/or communication bus 306 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

In the above description, for purposes of explanation, numerous specific details are set forth to provide a thorough understanding of the various aspects of different example embodiments. It should be evident, however, that any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A computer-implemented method comprising:
   receiving a first request associated with a first object storage operation, the first request including a first timestamp associated with the first object storage operation and a first object identifier identifying a first object associated with the first object storage operation;
   calculating a first inverse timestamp based on the first timestamp;
   generating a first object key corresponding to the first object storage operation, the first object key including at least the first object identifier and the first inverse timestamp; and
   inserting a first entry including the first object key into a key data store at a position relative to other object key entries based on the first object identifier and the first inverse timestamp included in the first object key, the key data store comprising an ordered set of object key entries including the other object key entries, each of the object key entries of the ordered set being associated with a corresponding object storage operation.

2. The computer-implemented method of claim 1, wherein the ordered set of object key entries is ordered based at least in part on object identifiers and inverse timestamps respectively included in object keys of the object key entries of the ordered set.

3. The computer-implemented method of claim 2, wherein the ordered set of object key entries is ordered alphanumerically.

4. The computer-implemented method of claim 1, further comprising:
receiving a second request concurrently with the first request, wherein:
the second request is associated with a second object storage operation;
the second request includes a second object identifier that is the same as the first object identifier;
a second inverse timestamp associated with the second object storage operation is the same as the first inverse timestamp; and
the first object storage operation and the second object storage operation are executed by different clients at the same time for the same object;
determining a unique client identifier for the first request;
determining a unique client identifier for the second request; and
generating a second object key corresponding to the second object storage operation, the second object key including at least the second object identifier, the second inverse timestamp, and the unique client identifier of the second request,
wherein the first object key further includes the unique client identifier of the first request.

5. The computer-implemented method of claim 4, further comprising:
inserting a second entry including the second object key into the key data store at a position based on the second inverse timestamp, the second object identifier, and the unique client identifier of the second request.

6. The computer-implemented method of claim 1, further comprising:
querying the key data store for object key entries containing the first object identifier; and
determining that none of the object key entries of the ordered set contains the first object identifier or that, from the ordered set of object key entries, a most-recent entry containing the first object identifier has an inverse timestamp that is greater than the first inverse timestamp.

7. The computer-implemented method of claim 1, further comprising:
querying the key data store for object key entries containing the first object identifier; and
determining that, from the ordered set of object key entries, a most-recent entry containing the first object identifier has an inverse timestamp that is less than the first inverse timestamp,
wherein calculating the first inverse timestamp further comprises adjusting the first inverse timestamp to have a value less than the inverse timestamp of the most-recent entry.

8. The computer-implemented method of claim 1, wherein calculating the first inverse timestamp further comprises:
determining a reference timestamp for the ordered set of object key entries; and
calculating the first inverse timestamp by subtracting a first timestamp value from the reference timestamp.

9. The computer-implemented method of claim 1, wherein generating the first object key corresponding to the first object storage operation further comprises:
appending the first inverse timestamp to the first object identifier as a suffix.

10. The computer-implemented method of claim 1, wherein the first object key corresponding to the first object storage operation further includes an operation type.

11. A key ticketing system comprising:
one or more processors;
a key data store comprising an ordered set of object key entries, each of the object key entries of the ordered set being associated with a corresponding object storage operation; and
a storage application executable by the one or more processors to perform operations comprising:
receiving a first request associated with a first object storage operation, the first request including a first timestamp associated with the first object storage operation and a first object identifier identifying a first object associated with the first object storage operation;
calculating a first inverse timestamp based on the first timestamp;
generating a first object key corresponding to the first object storage operation, the first object key including at least the first object identifier and the first inverse timestamp; and
inserting a first entry including the first object key into the key data store at a position relative to other of the object key entries of the ordered set based on the first object identifier and the first inverse timestamp included in the first object key.

12. The key ticketing system of claim 11, wherein the ordered set of object key entries is ordered based at least in part on object identifiers and inverse timestamps respectively included in object keys of the object key entries of the ordered set.

13. The key ticketing system of claim 12, wherein the ordered set of object key entries is ordered alphanumerically.

14. The key ticketing system of claim 11, wherein the operations further comprise:
receiving a second request concurrently with the first request, wherein:
the second request is associated with a second object storage operation;
the second request includes a second object identifier that is the same as the first object identifier;
a second inverse timestamp associated with the second object storage operation is the same as the first inverse timestamp; and
the first object storage operation and the second object storage operation are executed by different clients at the same time for the same object;
determining a unique client identifier for the first request;
determining a unique client identifier for the second request; and
generating a second object key corresponding to the second object storage operation, the second object key including at least the second object identifier, the second inverse timestamp, and the unique client identifier of the second request,
wherein the first object key further includes the unique client identifier of the first request.

15. The key ticketing system of claim 14, wherein the operations further comprise:

inserting a second entry including the second object key into the key data store at a position based on the second inverse timestamp, the second object identifier, and the unique client identifier of the second request.

16. The key ticketing system of claim 11, wherein the operations further comprise:
    querying the key data store for object key entries containing the first object identifier; and
    determining that none of the object key entries of the ordered set contains the first object identifier or that, from the ordered set of object key entries, a most-recent entry containing the first object identifier has an inverse timestamp that is greater than the first inverse timestamp.

17. The key ticketing system of claim 11, wherein the operations further comprise:
    querying the key data store for object key entries containing the first object identifier; and
    determining that, from the ordered set of object key entries, a most-recent entry containing the first object identifier has an inverse timestamp that is less than the first inverse timestamp,
    wherein calculating the first inverse timestamp further comprises adjusting the first inverse timestamp to have a value less than the inverse timestamp of the most-recent entry.

18. The key ticketing system of claim 11, wherein calculating the first inverse timestamp further comprises:
    determining a reference timestamp for the ordered set of object key entries; and
    calculating the first inverse timestamp by subtracting a first timestamp value from the reference timestamp.

19. The key ticketing system of claim 11, wherein generating the first object key corresponding to the first object storage operation further comprises:
    appending the first inverse timestamp to the first object identifier as a suffix.

20. A system comprising:
    means for storing an ordered set of object key entries, each of the object key entries of the ordered set being associated with a corresponding object storage operation;
    means for receiving a first request associated with a first object storage operation, the first request including a first timestamp associated with the first object storage operation and a first object identifier identifying a first object associated with the first object storage operation;
    means for calculating a first inverse timestamp based on the first timestamp;
    means for generating a first object key corresponding to the first object storage operation, the first object key including at least the first object identifier and the first inverse timestamp; and
    means for inserting a first entry including the first object key into the means for storing the ordered set of object key entries at a position relative to other of the object key entries of the ordered set based on the first object identifier and the first inverse timestamp included in the first object key.

* * * * *